(12) United States Patent
Knohl et al.

(10) Patent No.: US 11,001,531 B2
(45) Date of Patent: May 11, 2021

(54) CERAMIC COMPOSITE MATERIALS AND METHOD FOR PRODUCING SAME

(71) Applicant: Universität Bayreuth, Bayreuth (DE)

(72) Inventors: Stefan Knohl, Bayreuth (DE); Walter Krenkel, Bayreuth (DE); Georg Puchas, Bayreuth (DE); Thomas Wamser, Bayreuth (DE)

(73) Assignee: UNIVERSITÄT BAYREUTH, Bayreuth (DE)

( * ) Notice: Subject to any disclaimer, the term of this patent is extended or adjusted under 35 U.S.C. 154(b) by 0 days.

(21) Appl. No.: 16/311,984

(22) PCT Filed: Jun. 22, 2017

(86) PCT No.: PCT/EP2017/065408
§ 371 (c)(1),
(2) Date: Dec. 20, 2018

(87) PCT Pub. No.: WO2017/220727
PCT Pub. Date: Dec. 28, 2017

(65) Prior Publication Data
US 2019/0210930 A1    Jul. 11, 2019

(30) Foreign Application Priority Data

Jun. 22, 2016 (DE) .................... 10 2016 007 652.6
Jun. 13, 2017 (WO) ................. PCT/EP2017/064401

(51) Int. Cl.
*C04B 35/80* (2006.01)
*B32B 18/00* (2006.01)
(Continued)

(52) U.S. Cl.
CPC ............ *C04B 35/803* (2013.01); *B32B 5/022* (2013.01); *B32B 18/00* (2013.01); *C04B 35/111* (2013.01); *C04B 35/119* (2013.01); *C04B 35/14* (2013.01); *C04B 35/185* (2013.01); *C04B 35/44* (2013.01); *C04B 35/486* (2013.01); *C04B 35/4885* (2013.01); *C04B 35/505* (2013.01); *C04B 35/52* (2013.01); *C04B 35/565* (2013.01);
(Continued)

(58) Field of Classification Search
CPC ..................................................... C04B 35/803
USPC ....................................................... 428/699
See application file for complete search history.

(56) References Cited

U.S. PATENT DOCUMENTS

| 4,983,422 A | 1/1991 | Davis et al. |
| 2002/0197465 A1 | 12/2002 | Butner et al. |
| 2014/0200130 A1 | 7/2014 | Szweda et al. |

FOREIGN PATENT DOCUMENTS

| EP | 2380862 | 10/2011 | |
| WO | WO 2016/016388 | 2/2016 | |
| WO | WO-2016016388 A1 * | 2/2016 | ........... C04B 35/119 |

OTHER PUBLICATIONS

German Search Report issued in German Application No. 102016007652.6, dated Feb. 24, 2017.
(Continued)

*Primary Examiner* — Brent T O'Hern
(74) *Attorney, Agent, or Firm* — Parker Highlander PLLC

(57) ABSTRACT

Disclosed herein are prepregs for ceramic matrix composites, processes for the preparation of a green bodies using the prepregs disclosed herein, and processes for the preparation of the ceramic matrix composites from the green bodies prepared according processes provided herein.

16 Claims, 1 Drawing Sheet

(51) Int. Cl.
| | |
|---|---|
| C04B 35/634 | (2006.01) |
| C04B 35/565 | (2006.01) |
| C04B 35/111 | (2006.01) |
| C04B 35/632 | (2006.01) |
| C04B 35/52 | (2006.01) |
| C04B 35/486 | (2006.01) |
| C04B 35/119 | (2006.01) |
| C04B 35/488 | (2006.01) |
| C04B 35/505 | (2006.01) |
| C04B 35/44 | (2006.01) |
| C04B 35/14 | (2006.01) |
| C04B 35/185 | (2006.01) |
| B32B 5/02 | (2006.01) |
| C04B 35/626 | (2006.01) |
| C04B 35/628 | (2006.01) |
| C04B 35/64 | (2006.01) |
| C04B 37/00 | (2006.01) |

(52) U.S. Cl.
CPC .... *C04B 35/6264* (2013.01); *C04B 35/62852* (2013.01); *C04B 35/62855* (2013.01); *C04B 35/62886* (2013.01); *C04B 35/632* (2013.01); *C04B 35/63488* (2013.01); *C04B 35/64* (2013.01); *C04B 35/806* (2013.01); *C04B 37/001* (2013.01); *B32B 2262/10* (2013.01); *C04B 2235/3217* (2013.01); *C04B 2235/3225* (2013.01); *C04B 2235/3244* (2013.01); *C04B 2235/522* (2013.01); *C04B 2235/524* (2013.01); *C04B 2235/526* (2013.01); *C04B 2235/5224* (2013.01); *C04B 2235/5228* (2013.01); *C04B 2235/5236* (2013.01); *C04B 2235/5244* (2013.01); *C04B 2235/5256* (2013.01); *C04B 2235/602* (2013.01); *C04B 2235/616* (2013.01); *C04B 2235/764* (2013.01); *C04B 2237/343* (2013.01); *C04B 2237/348* (2013.01); *C04B 2237/38* (2013.01)

(56) References Cited

OTHER PUBLICATIONS

PCT International Search Report and Written Opinion issued in International Application No. PCT/EP2017/065408, dated Oct. 6, 2017.

\* cited by examiner

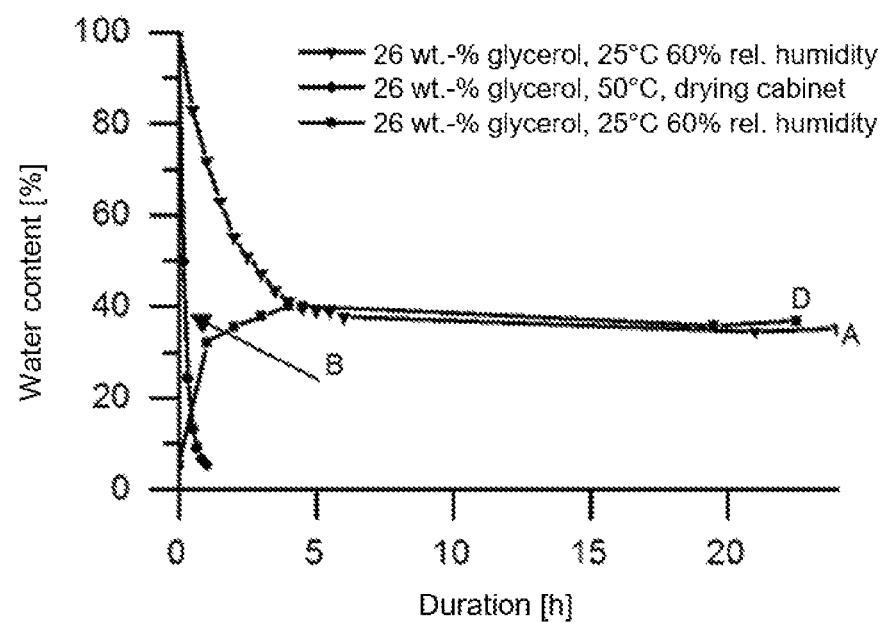

CERAMIC COMPOSITE MATERIALS AND METHOD FOR PRODUCING SAME

This application is a national phase application under 35 U.S.C. § 371 of International Application No. PCT/EP2017/065408, filed Jun. 22, 2017, which claims benefit of International Application No. PCT/EP2017/064401, filed Jun. 13, 2017, and German Application No. 10 2016 007 652.6, filed Jun. 22, 2016, the entire contents of each of which are hereby incorporated by reference.

BACKGROUND OF THE INVENTION

Field of the Invention

The present invention relates to the material and process development of materials, in particular of ceramic fiber-reinforced matrix composites. In this connection, a prepreg for a ceramic matrix composite, a process for the preparation of a green body with the help of the prepreg, and a process for the preparation of the ceramic matrix composite from the green body prepared according to the present invention are provided.

Description of Related Art

Monolithic ceramic materials generally fracture in a brittle manner. Ductile or quasi-ductile fracture behaviour can be achieved in ceramic fiber reinforced ceramic materials ("composites") by combining fibers in a ceramic matrix (e.g. EP1645410 A2 or DE102010055221 A1). The ceramic matrix composites comprise ceramic fibers (e.g. C, SiC, $Al_2O_3$, mullite) and a ceramic matrix (e.g. C, SiC, $Al_2O_3$, mullite).

As a rule, high-temperature resistant continuous fiber bundles consisting of up to 50,000 individual filaments are used as fiber reinforcement. The fracture behavior of the composite is adapted by specifically adjusting the fiber/matrix bond. It is crucial that a crack is not transmitted into the fiber through the matrix but that energy dissipating effects, such as crack branching, crack diversion, or fiber pull out, take place. A common concept involves a fiber coating for adjusting the fiber/matrix bond. Another approach is embedding the fibers in a porous weak matrix. Due to the high porosity of the matrix and thus its reduced stiffness, the energy dissipating effects described above are achieved which lead to a quasi-ductile fracture behavior.

The matrix is usually synthesized by impregnating the fiber rovings or fiber structure with slurries, precursors, polymers or molten metal. Via a heat treatment at more than 1000° C., the matrix is formed. The matrix must exhibit sufficient strength to cause a transmission of force between the fiber filaments. EP1734023 A1 and EP1734024 A1 disclose slurries for the preparation of ceramic fiber-reinforced composite materials which contain specifically treated or selected oxide-ceramic powders, and which can be free of organic binders.

Challenges in the preparation of ceramic matrix composites include the adjustment of a uniform, high fiber volume content (preferably more than 25 vol.-%) and the creation of a homogeneous (if porous) matrix surrounding the fibers. The high fiber volume content and the homogeneous matrix are advantageous for realizing desired properties, such as a bending strength of more than 50 MPa and a quasi-ductile fracture behavior.

In the synthesis of the ceramic matrix, it has to be kept in mind that it should only slightly shrink during sintering, and that in order to obtain the desired quasi-ductile fracture behavior, the fiber bundles have to be completely impregnated. Thus, in conventional preparation processes for ceramic matrix composites using aqueous slurries, efforts are made to obtain a high green density and thus a low shrinkage during sintering by using a high solids content in the slurry during the impregnation of the fibers. However, a slurry with a high solids content also has a high viscosity, which makes a complete impregnation of the fiber bundles or semi-finished products prepared therefrom (e.g. fabrics) very difficult.

One possibility of adjusting a high green density is the impregnation of fiber architectures with low-viscosity slurries with a low solids content, followed by a partial removal of water by pre-drying. Pre-drying can be carried out in a drying cabinet until the desired amount of water has been removed.

The addition of glycerol to the slurry as described in WO 2016/016388 A1 has been found to be an advantageous approach. After impregnating a fiber architecture with such a slurry, a defined water content in the slurry surrounding the fibers can be adjusted for example by means of conditioning in a climate chamber at a defined temperature and humidity. The resulting prepreg typically comprises a fiber fabric or another fiber sheet-structure (e.g. mat, web, non-woven) and the slurry which can serve for the creation of the matrix during a subsequent sintering step. The conditioned slurry preferably exhibits a high viscosity and can furthermore be used to impart tackiness to the impregnated fiber architecture. The slurry-impregnated fiber architecture can thus exhibit a high degree of tackiness and drapability which is advantageous for shaping. This allows the lay-up of the prepregs onto or into a mold (convex or concave) without requiring a mold counterpart as for example in hot pressing. During the shaping process, e.g. laminating, a high fiber volume content (e.g. >30 vol.-%) can be achieved to obtain advantageous mechanical characteristics. Nonetheless, the fibers in the prepreg can rearrange themselves, and possible excess matrix material can be squeezed out during shaping. Only low laminating pressures are required, so that damage to the fibers can be avoided. As a result of the shaping procedure, self-supporting structures can be provided, e.g. complex high-volume structures, which can subsequently be hardened by means of a temperature treatment without softening by sintering. The lay-up process of the individual prepreg layers with a uniform fiber volume content and a homogeneous matrix is reproducible. Despite the tackiness, individual layers can be removed again and re-positioned with a different fiber orientation.

The properties of the slurry which surrounds the fibers in the prepreg, and in particular its drying characteristics and humidification, are significantly influenced by the addition of glycerol. During the sintering process, the excess glycerol is burned off without residue. It can act as a pore forming agent which increases the damage tolerance of the composite material.

The amount of glycerol to be added is determined by two aspects: On the one hand, the adjustment of the moisture content in the prepreg at a pre-determined atmosphere and temperature. In addition, after drying of the prepreg(s), the green body should be self-supporting and not be destabilized by taking up water from the ambient air due to the hygroscopic properties of the glycerol in the green body. Thus, when glycerol was used in the preparation of the prepregs, the added amount was adjusted such that after the removal of water, a stable green body was obtained. The disadvantage of such prepregs is that when they are processed under common manufacturing conditions, such as an atmospheric humidity of about 30 to 60% relative humidity, they dry up. Thus, the prepregs have to be processed quickly in order to make optimum use of their advantageous properties such as their tackiness and drapability, and temporary storage would have to involve controlled conditions and, in particular, increased humidity. Furthermore, the automatic manufacture of prepregs on a prepreg production line is problematic. In a prepreg production line, the fiber architectures are continuously infiltrated and subsequently dried or conditioned. At belt speeds of about 1 m/min and an (climatized) drying zone of 5 m, there is a time period of about 5 minutes available after the fiber structure has been impregnated during which a high solids content can be adjusted in the slurry by removing water, e.g. by means of conditioning at a controlled temperature and atmospheric humidity. Previously known slurries which contain glycerol are typically adjusted/conditioned for significantly longer than one hour in order to guarantee a controlled decrease of the water content in the slurry. If the water content of the slurry in the prepreg decreases too much during a fast removal of water, the prepreg may lose its hydroplasticity, which leads to a decreased quality of the prepreg. The term hydroplasticity in this context describes the ability of the prepreg material to change from a state with a lower water content, in which the prepreg exhibits elastic properties, to a state with a higher water content, in which the material exhibits plastic behavior, or can be subjected to plastic deformation, by the re-uptake of water in the slurry.

BRIEF SUMMARY OF THE INVENTION

Against this background, the present invention provides a process for the preparation of a green body for a ceramic matrix composite comprising the following steps:
 a) impregnating an arrangement of ceramic fibers with a slurry, which slurry comprises the following components:
  (i) 10 to 40 vol.-%, based on the total volume of the slurry, of ceramic particles,
  (ii) an alcoholic organic solvent selected from:
  (ii-1) 21 to 35 wt.-%, based on the total weight of the ceramic particles in the slurry, of glycerol,
  (ii-2) 10 to 35 wt.-%, based on the total weight of the ceramic particles in the slurry, of an oligo or polyethylene glycol with an average molecular weight of at most 800 g/mol,
  (ii-3) 10 to 35 wt.-%, based on the total weight of the ceramic particles in the slurry, of at least one C2-C6 alkane diol, and
  (ii-4) 10 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol; and
  (iii) water;
 b) reducing the water content in the slurry in the impregnated fiber arrangement to obtain a prepreg for a ceramic matrix composite;
 c) providing a shaped composite material from one or more prepregs obtained according to step b);
 d) consolidating the shaped composite material by reducing the water content and the content of alcoholic organic solvent so that a green body is obtained.

A process for the preparation of the ceramic matrix composite by sintering the obtained green body is a subject matter of the present invention as well.

Furthermore, the present invention provides a prepreg for a ceramic matrix composite comprising an arrangement of ceramic fibers impregnated with a slurry wherein the slurry comprises the following components:
 (i) ceramic particles,
 (ii) an alcoholic organic solvent selected from:
 (ii-1) 21 to 35 wt.-%, based on the total weight of the ceramic particles in the slurry, of glycerol,
 (ii-2) 10 to 35 wt.-%, based on the total weight of the ceramic particles in the slurry, of an oligo or polyethylene glycol with an average molecular weight of at most 800 g/mol,
 (ii-3) 10 to 35 wt.-%, based on the total weight of the ceramic particles in the slurry, of at least one C2-C6 alkane diol, and
 (ii-4) 10 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol; and
 (iii) water.

BRIEF DESCRIPTION OF THE DRAWINGS

FIG. 1 shows the change in the water content of the slurry in the prepreg during the course of conditioning or drying, with a view to the water content of the slurry after infiltration and as a function of the duration.

DESCRIPTION OF ILLUSTRATIVE EMBODIMENTS

Within the framework of the present invention, it was found that certain alcoholic organic solvents can be used in slurries for ceramic matrix composite materials as an alternative to or in addition to glycerol in order to obtain prepregs with advantageous processability, in particular advantageous tackiness and drapability, and in order to provide green bodies with a high green density. By conditioning the slurry contained in the fiber structure, these properties can be provided repeatedly and consistently in the form of a prepreg, e.g. even after complete drying and storage of the prepregs.

By using a slurry with the preferred high contents of alcoholic organic solvents, prepregs are advantageously obtained which can be stored over an extended period of time in an environment with low atmospheric humidity and/or which can be processed further without losing their hydroplastic properties. Furthermore, when the prepregs are provided, the water content of the slurry contained in the prepreg can be reduced more rapidly, i.e. higher temperatures and/or lower degrees of atmospheric humidity (e.g. 100° C., 10% rel. humidity) can be used without there being the danger of an irreversible loss of hydroplasticity. Thus, the time required for manufacturing the prepreg can be shortened considerably (e.g. to less than an hour). This also allows an automatic manufacture of the prepregs.

Furthermore, the process of the present invention, which comprises a consolidation step during the preparation of a green body, allows a variation of the alcoholic solvent content over a wide range without affecting the desired properties of the resulting green body due to the hygroscopic properties of the alcoholic solvent. Thus, in a preferred embodiment of the present invention, slurries with a comparatively high alcoholic solvent content, preferably with a high glycerol content, can be used in particular. For providing a dimensionally stable, typically self-supporting green body according to this preferred embodiment, which is not destabilized by the uptake of water due to the hygroscopic properties of the alcoholic solvent contained therein, in the context of the process of the invention for the preparation of a green body a shaped composite material is first formed from the prepreg(s) with a high alcoholic solvent content. In a subsequent consolidation step, the water content and the content of alcoholic solvent of the slurry contained in the composite material are reduced to obtain the green body. Thus, a re-humidification of the resulting green body during storage under normal ambient conditions, such as e.g. a room temperature of 20° C. and an atmospheric humidity of <60% relative humidity, which otherwise would result in a destabilization or a softening of the green body, is no longer possible. Due to the possibility of a rapid reduction of the water content, a significant amount of time is gained during the preparation of the prepregs despite the consolidation step, so that by using the process according to the present invention, a green body for a ceramic matrix composite material or the ceramic matrix composite material itself can be produced within a short period of time. A production time of 36 hours or less for the composite material is therefore feasible.

As was stated above, one aspect of the invention is directed to a process for the preparation of a green body for a ceramic matrix composite comprising the steps a) to d):
a) impregnating an arrangement of ceramic fibers with a slurry, which slurry comprises the following components:
(i) 10 to 40 vol.-%, based on the total volume of the slurry, of ceramic particles,
(ii) an alcoholic organic solvent selected from:
(ii-1) 21 to 35 wt.-%, based on the total weight of the ceramic particles in the slurry, of glycerol,
(ii-2) 10 to 35 wt.-%, based on the total weight of the ceramic particles in the slurry, of an oligo or polyethylene glycol with an average molecular weight of at most 800 g/mol,
(ii-3) 10 to 35 wt.-%, based on the total weight of the ceramic particles in the slurry, of at least one C2-C6 alkane diol, and
(ii-4) 10 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol; and
(iii) water;
b) reducing the water content in the slurry in the impregnated fiber arrangement to obtain a prepreg for a ceramic matrix composite;
c) providing a shaped composite material from one or more prepregs obtained according to step b);
d) consolidating the shaped composite material by reducing the water content and the content of alcoholic organic solvent so that a green body is obtained.

The solvents mentioned in step a) of item (ii) are typically liquid at room temperature, e.g. 20° C. Preferably, they exhibit hygroscopic properties.

In step b), the water content of the slurry in the impregnated fiber arrangement is reduced. In the process, the content of alcoholic organic solvent is usually not or only slightly reduced.

The prepreg according to the present invention is obtained as an intermediate product in step b) of the process. It will therefore be apparent to the skilled reader that the following explanations regarding steps a) to b) of the process according to the present invention apply likewise to the prepreg according to the present invention and its preparation, unless specifically indicated otherwise.

The arrangement of ceramic fibers in step a) of the process according to the present invention (also referred to as "fiber arrangement") and in the prepreg according to the present invention is formed by ceramic fibers. The ceramic fibers preferably comprise rovings, i.e. fiber bundles of ceramic filaments, and more preferred, the arrangement of ceramic fibers consists of such rovings. For example, the ceramic fibers can combine 100 or more of such filaments in one roving. Preferably, they comprise 300 or more, and more preferred 400 or more of the filaments. The maximum number of filaments per bundle is not particularly limited as long as the bundles can conveniently be prepared and handled. For instance, fiber bundles with a maximum number of filaments of 50,000, preferably a maximum of 20,000, more preferred a maximum of 10,000, especially preferred a maximum of 5,000, and most preferred a maximum of 1,000, can be used. The filaments typically have a diameter in the μm range, e.g. in the range of 3 to 15 μm, preferably in the range of 7 to 13 μm. According to the understanding of the person skilled in the art, the term "bundle" in this connection refers to a combination of filaments which are arranged adjacent to each other with their long axis extending side-by-side. Generally, filaments within the bundle are not intertwined with their neighboring filaments. However, the bundle as a whole may be twisted.

The ceramic fibers may be selected e.g. from continuous fibers, chopped fibers, or combinations thereof. Chopped fibers for example have a length of less than 100 mm, preferably less than 30 mm. Preferably, they are not shorter than 20 mm. Arrangements of continuous ceramic fibers are preferred arrangements of ceramic fibers.

The arrangement of ceramic fibers is preferably a sheet, for example a woven or non-woven sheet. Such sheets can have a regular form, such as a rectangle or a square form, they can be provided in the form of a tape, or they can have any irregular form adapted to the respective purpose. They can also be brought into a predetermined shape such as a wound body. For winding, the roving is first impregnated and then layed up around a core. A similar approach is conceivable for braiding processes. Typically, the thickness of a sheet of ceramic fibers in the context of the present invention ranges from 0.25 mm to 10 mm, preferably from 0.25 mm to 3 mm. Other preferred arrangements of ceramic fibers are three-dimensional braided structures or non-wovens. In particular, woven or non-woven sheets made from continuous fibers in the form of rovings are preferred as fiber arrangements.

The ceramic fibers for use in the present invention as well as arrangements made from them, e.g. in the form of sheets, are readily commercially available as fibers and semi-finished products.

As a rule, the ceramic fibers which form the arrangement impregnated in step a) of the process according to the invention are also contained in the provided prepreg and in the green body. As is apparent to the person skilled in the art, typically the arrangement of the fibers essentially remains unchanged in the prepreg and the green body, however, fibers or filaments can be shifted due to the impregnation with the slurry. For instance, rovings may swell or filaments contained therein may be separated.

In terms of ceramic materials suitable for the ceramic fibers, the present invention imposes no particular limitations. For example, the ceramic fibers may comprise $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC, SiCN, SiBNC, or carbon, or combinations of two or more types of such materials. Such combinations may be blends of ceramics or composites of different materials within a fiber structure, or arrangements comprising fibers of different materials. An example of a fiber of a combination of ceramic materials is a combination of $Al_2O_3$ and mullite, as it is used in fibers commercially available under the trademark Nextel®.

In the ceramic fibers formed from the ceramic materials mentioned above, the content of those materials is preferably 90 wt.-% or higher, more preferred 95 wt.-% or higher, based on the total weight of the ceramic fibers as 100 wt.-%, or the ceramic fibers consist of those ceramic materials.

Ceramic fibers and semi-finished products prepared therefrom can comprise a sizing agent applied during their preparation process. Within the framework of the present invention, it can be beneficial to remove the optionally present sizing agent prior to impregnating the arrangement of ceramic fibers, e.g. by means of a heat treatment.

The slurry used in step a) of the process according to the present invention, and thus also the prepregs according to the present invention, comprise ceramic particles. These particles comprise, and preferably consist of, a ceramic material. The ceramic material is not particularly limited, but it will be understood by the person skilled in the art that the ceramic material should be one which can be sintered to provide a ceramic matrix in a ceramic matrix composite. The ceramic particles can for example comprise $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC or carbon, or combinations of two or more types of such materials. Such combinations may be blends of ceramics or composites of different ceramic materials within individual particles, or particle mixtures comprising particles of different materials. Particles consisting of a single material selected from $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC and carbon, but which can optionally also be used as mixtures comprising particles of different materials, are preferred. The ceramic material of the ceramic fibers can correspond to the ceramic material of the ceramic particles, or they can be different. Correspondence is preferred so that a thermomechanical and thermodynamic compatibility can be achieved.

Preferably, the ceramic particles have an average particle size (volume average, as determined e.g. by laser diffraction) of 3 µm or less, more preferred 2 µm or less, and especially preferred 1 µm or less. Also, it is preferred that the average particle size be 0.1 µm or more. It is also preferred that no particles with a particle size of >25 µm, as determined by laser diffraction, be present. It is more preferred that no particles with a particle size of >15 µm be present. Ceramic powders with diverse particle size distributions are commercially available. If necessary or desired, the particle size can be adjusted, e.g. by milling the particles.

Particularly preferred ceramic particles are mixtures of such particles with a bimodal particle size distribution (volumetric fraction vs. particle size, as determined by laser diffraction), showing a peak in the range of 0.05 to 0.3 µm, preferably in the range of 0.08 to 0.2 µm and a peak in the range of 0.5 to 3 µm, preferably in the range of 0.7 to 1.2 µm. Moreover, it is preferred that the peak in the range of 0.05 to 0.3 µm, preferably in the range of 0.08 to 0.2 µm accounts for a volumetric fraction of 3 to 25 vol.-% of the particles, and the peak in the range of 0.5 to 3 µm, preferably in the range of 0.7 to 1.2 µm, accounts for 75 to 97 vol.-% of the particles. The volumetric fraction of the particles of the respective sizes can be determined, if necessary, from the cumulative size distribution of the particles determined, e.g., via laser diffraction. However, as a rule, these preferred slurries can be conveniently prepared by mixing ceramic particles with the desired sizes.

The slurry used in step a) of the process according to the present invention comprises 10 to 40 vol.-% of ceramic particles, based on the total volume of the slurry as 100 vol.-%. Preferably, the slurry comprises at least 20 vol.-% of ceramic particles (i.e. 20 to 40 vol.-%), more preferred at least 25 vol.-% of ceramic particles (i.e. 25 to 40 vol.-%), and especially preferred at least 30 vol.-% of ceramic particles (i.e. 30 to 40 vol.-%). As a rule, the particles introduced by the slurry during impregnation are also present in the prepreg provided in step b) of the process according to the present invention. However, as will be apparent to the person skilled in the art, the solid content of the slurry is increased due to the reduction of the water content in step b) so that the volume fraction of the ceramic particles in the resulting prepreg is higher. The green body comprises the ceramic particles as well, however, during the provision of the shaped composite material in step c), certain portions of the slurry initially introduced during impregnation and the particles contained therein can be removed. For instance, excess slurry can be squeezed out of the composite material during a laminating process.

In addition to the ceramic particles, the slurry used in step a) of the process according to the present invention, and thus the prepregs according to the present invention, comprise an alcoholic organic solvent selected from:

(ii-1) 21 to 35 wt.-%, based on the total weight of the ceramic particles in the slurry, of glycerol, (ii-2) 10 to 35 wt.-%, based on the total weight of the ceramic particles in the slurry, of an oligo or polyethylene glycol with an average molecular weight of at most 800 g/mol, (ii-3) 10 to 35 wt.-%, based on the total weight of the ceramic particles in the slurry, of at least one C2-C6 alkane diol, and (ii-4) 10 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol.

As is clear from this list, the embodiments (ii-1) to (ii-4) are alternative embodiments which are not used in combination. The term "alcoholic organic solvent" indicates that the substances comprise alcoholic hydroxyl groups (OH groups). As solvents, they are liquid, soluble in water, and preferably hygroscopic, at the processing temperature of the slurry, typically a temperature of 20° C. The solvent does not affect the stability of the suspension. Just like the water, the solvent is a dispersion medium and surrounds the powder particles. Thus, the ceramic powder cannot agglomerate.

Of the embodiments (ii-1) to (ii-4), the embodiment (ii-1) is preferred, i.e. the impregnation of an arrangement of ceramic fibers in step a) is preferably carried out with a slurry comprising the following components:

10 to 40 vol.-%, based on the total volume of the slurry, of ceramic particles, 21 to 35 wt.-%, based on the total weight of the ceramic particles in the slurry, of glycerol, and water.

The glycerol content of the slurry in step a) according to the preferred embodiment (ii-1) of the process according to the present invention, and thus that of the prepregs provided according to a preferred embodiment, is 21 to 35 wt.-%, based on the total weight of the ceramic particles in the slurry as 100 wt.-%. Glycerol is hygroscopic, water-soluble, and shows a dispersing effect for ceramic particles. The evaporation of glycerol during preparation and processing is negligible. The use of glycerol allows the solid content of the slurry to be conveniently adjusted after the impregnation of the arrangement of fibers via the reduction of the water content. Thus, in step a) of the process according to the present invention, a slurry with a lower solid content and thus lower viscosity can be used for impregnating the fiber arrangement. A complete impregnation of the fiber arrangement where the slurry (or the particles) can also penetrate any fiber bundles which may be present, is therefore possible. Via the subsequent removal of water (e.g. by evaporation), a higher solid content can be achieved. The fact that, in an atmosphere with a predetermined temperature and humidity, in the slurry an equilibrium between glycerol and water will be attained independently of the initial water content, can be taken advantage of in this connection.

It is more preferred that the slurry according to the preferred embodiment (ii-1) of the process according to the present invention comprise glycerol in an amount of at least 24 wt.-%, even more preferred at least 25 wt.-% of glycerol, and especially preferred at least 26 wt.-% of glycerol, based on the total weight of the ceramic particles in the slurry as 100 wt.-%. Preferably, the slurry comprises at most 30 wt.-% of glycerol, more preferred at most 29 wt.-% of glycerol, and especially preferred at most 28 wt.-% of glycerol, based on the total weight of the ceramic particles in the slurry as 100 wt.-%.

According to embodiment (ii-2) described above, the slurry used in step a) comprises an oligo or polyethylene glycol with an average molecular weight of at most 800 g/mol in an amount of 10 to 35 wt.-%, based on the total weight of the ceramic particles in the slurry as 100 wt.-%, as alcoholic organic solvent.

Preferably, the slurry according to embodiment (ii-2) of the process according to the present invention comprises the oligo or polyethylene glycol in an amount of at least 21 wt.-%, more preferred in an amount of at least 24 wt.-%, even more preferred at least 25 wt.-%, and especially preferred at least 26 wt.-%, based on the total weight of the ceramic particles in the slurry as 100 wt.-%. It is preferred that the slurry comprise at most 30 wt.-% of the oligo or polyethylene glycol, more preferred at most 29 wt.-%, and especially preferred at most 28 wt.-%, based on the total weight of the ceramic particles in the slurry as 100 wt.-%.

The average molecular weight (typically given as the number average) of the oligo or polyethylene glycol is preferably at most 600 g/mol, more preferred at most 400 g/mol. Typically, the oligo or polyethylene glycol comprises at least 10 repeating units ($-C_2H_4O-$).

As was already stated above, these explanations regarding the preferred structure and/or the preferred amounts of the oligo or polyethylene glycol analogously apply to the prepregs according to the present invention which are provided with the help of a slurry according to embodiment (ii-2).

According to embodiment (ii-3) described above, the slurry used in step a) comprises a C2-C6 alkane diol in an amount of 10 to 35 wt.-%, based on the total weight of the ceramic particles in the slurry as 100 wt.-%, as alcoholic organic solvent. This also encompasses mixtures of different C2-C6 alkane diols.

Preferably, the slurry according to embodiment (ii-3) of the process according to the present invention comprises the C2-C6 alkane diol in an amount of at least 21 wt.-%, more preferred in an amount of at least 24 wt.-%, even more preferred at least 25 wt.-%, and especially preferred at least 26 wt.-%, based on the total weight of the ceramic particles in the slurry as 100 wt.-%. It is preferred that the slurry comprise at most 30 wt.-% of the C2-C6 alkane diol, more preferred at most 29 wt.-%, and especially preferred at most 28 wt.-%, based on the total weight of the ceramic particles in the slurry as 100 wt.-%.

As is known to the person skilled in the art, the term "C2-C6 alkane diol" denotes an alkane with 2 to 6 carbon atoms wherein 2 hydrogen atoms are replaced with OH groups. Preferably, the OH groups in the C2-C6 alkane diol are only primary or secondary, more preferred only primary OH groups.

Preferably, a C2-C4 alkane diol is used in embodiment (ii-3).

Thus, it is more preferred that the slurry comprise as an alcoholic organic solvent according to embodiment (ii-3) a solvent selected from ethane-1,2-diol, 1,2-propane diol, 1,3-propane diol, 1,4-butane diol, 2-methyl-1,3-propane diol and mixtures of at least two of those solvents. Even more preferred, the slurry according to embodiment (ii-3) comprises a solvent selected from ethane-1,2-diol and 1,2-propane diol as alcoholic organic solvent, and ethane-1,2-diol is especially preferred as alcoholic organic solvent according to embodiment (ii-3).

As was already stated above, these explanations regarding the preferred structure and/or the preferred amounts of the C2-C6 alkane diol analogously apply to the prepregs according to the present invention which are provided with the help of a slurry according to embodiment (ii-3).

According to embodiment (ii-4) described above, the slurry used in step a) comprises a mixture of two or more components selected from a C2-C6 alkane diol, an oligo or polyethylene glycol with an average molecular weight of at most 800 g/mol, and glycerol, in an amount of 10 to 35 wt.-%, based on the total weight of the ceramic particles in the slurry as 100 wt.-%, as an alcoholic organic solvent.

Preferably, the slurry according to embodiment (ii-4) of the process according to the present invention comprises the mixture in an amount of at least 21 wt.-%, more preferred in an amount of at least 24 wt.-%, even more preferred at least 25 wt.-%, and especially preferred at least 26 wt.-%, based on the total weight of the ceramic particles in the slurry as 100 wt.-%. It is preferred that the slurry comprise at most 30 wt.-% of the mixture, more preferred at most 29 wt.-%, and especially preferred at most 28 wt.-%, based on the total weight of the ceramic particles in the slurry as 100 wt.-%.

Regarding the preferred oligo or polyethylene glycols and the preferred C2-C6 alkane diols, the explanations given for embodiments (ii-2) and (ii-3), respectively, analogously apply to embodiment (ii-4).

As was already stated above, these explanations regarding the preferred structure of the components of the mixture and/or the preferred amounts of the mixture analogously apply to the prepregs according to the present invention which are provided with the help of a slurry according to embodiment (ii-4).

Specific examples of alcoholic organic solvents according to embodiments (ii-2), (ii-3) or (ii-4), which can be used according to the present invention as an alternative to glycerol, include the following:
    an oligo or polyethylene glycol with an average molecular weight of at most 800 g/mol; an oligo or polyethylene glycol with an average molecular weight of at most 800 g/mol in admixture with glycerol; an oligo or polyethylene glycol with an average molecular weight of at most 800 g/mol with at least one diol, selected from 1,2-propane diol, 1,3-propane diol, 1,4-butane diol, 2-methyl-1,3-propane diol and ethane-1,2-diol ethane-1,2-diol; ethane-1,2-diol in admixture with glycerol; ethane-1,2-diol in admixture with at least one diol selected from 1,2-propane diol, 1,3-propane diol, 1,4-butane diol and 2-methyl-1,3-propane diol; ethane-1,2-diol in admixture with an oligo or polyethylene glycol with an average molecular weight of at most 800 g/mol 1,2-propane diol; 1,2-propane diol in admixture with at least 40 wt.-%, based on the total weight of the alcoholic organic solvent as 100 wt.-%, of at least one solvent selected from glycerol, an oligo or polyethylene glycol with an average molecular weight of at most 800 g/mol, and ethane-1,2-diol;

1,3-propane diol in admixture with at least 40 wt.-%, based on the total weight of the alcoholic organic solvent as 100 wt.-%, of at least one solvent selected from glycerol, an oligo or polyethylene glycol with an average molecular weight of at most 800 g/mol, and ethane-1,2-diol;

1,4-butane diol in admixture with at least 50 wt.-%, based on the total weight of the alcoholic organic solvent as 100 wt.-%, of at least one solvent selected from glycerol, an oligo or polyethylene glycol with an average molecular weight of at most 800 g/mol, and ethane-1,2-diol;

2-methyl-1,3-propane diol in admixture with at least 50 wt.-%, based on the total weight of the alcoholic organic solvent as 100 wt.-%, of at least one solvent selected from glycerol, an oligo or polyethylene glycol with an average molecular weight of at most 800 g/mol, and ethane-1,2-diol.

The oligo or polyethylene glycol with an average molecular weight of at most 800 g/mol and/or the C2-C6 alkane diol can be used in slurries according to embodiments (ii-2) to (ii-4) in order to, e.g., adjust the viscosity of the slurry as needed. Slurries comprising these substances as an alternative to or in admixture with glycerol can exhibit reduced viscosity compared to glycerol and thus facilitate the impregnation process. This effect is especially pronounced in the case of high amounts of the alcoholic organic solvent in the slurry, e.g. amounts of at least 21 wt.-%. Furthermore, the use of the oligo or polyethylene glycol with an average molecular weight of at most 800 g/mol and/or the C2-C6 alkane diol in slurries according to embodiments (ii-2) to (ii-4) can facilitate the recovery of the alcoholic solvent during the subsequent processing of the prepregs to form green bodies and beyond since they generally have a lower condensation point compared to glycerol.

The amount of the alcoholic organic solvent in the slurry contained in the prepreg in relation to the ceramic particles contained in the slurry usually remains unchanged compared to the slurry used in step a) of the process according to the present invention or is only slightly reduced (e.g. by less than 5 wt.-%, preferably by less than 3 wt.-%, based on the amount in the slurry used in step a) as 100 wt.-%). Preferably, the amount remains unchanged. In the green body, the amount of the alcoholic organic solvent decreases relative to the ceramic particles as a consequence of the consolidation in step d).

In addition to the alcoholic organic solvent, the liquid phase of the slurry used in step a) of the process according to the present invention and of the slurry used in the prepreg, comprises water as an essential component. In addition to the alcoholic organic solvent and water, other solvents, such as non-alcoholic organic solvents may be added to the slurry. However, for economic and environmental purposes, it is preferred that at least 80 vol.-%, preferably 90 vol.-% of the liquid phase of the slurry (as determined at 20° C.) is an alcoholic organic solvent, preferably glycerol and water. Solids dissolved in the liquid phase are not considered part of the volume of the liquid phase. It is most preferred that the liquid phase consist of the alcoholic organic solvent, preferably of glycerol, and water.

In addition to the ceramic particles, the slurry may contain additives which facilitate the handling of the slurry, the impregnation and/or the drying and sintering of the slurry to form a ceramic matrix. Such additives include for example a dispersant, or organic additives for influencing viscosity (e.g. thixotropic agents). If a dispersant is used, it is typically contained in amounts of up to 5 wt.-%, preferably up to 2 wt.-%, based on the total weight of the solids in the slurry as 100 wt.-%. Suitable dispersants are e.g. polymers with ionic groups, such as carboxylic acid groups in protonated or ionic form, covalently attached to the polymer chain. A preferred dispersant is an acrylic acid polymer or acrylic acid copolymer. For the copolymer, it is preferred that the content of polymerized acrylic acid units is 50 mol-% or more, more preferably 70 mol-% or more. Particularly preferred is polyacrylic acid. If the dispersant is a polymer, it is typically a low molecular weight polymer, e.g. with molecular weights of <5,000 g/mol, in particular <2,000 g/mol.

It is not necessary to add an organic binder to the slurry used in step a) of the process according to the present invention and contained in the prepreg. A paraffin or a wax is not needed, either. However, an organic binder can optionally be used to control desired properties of the slurry. For example, the storability of the prepregs can be increased by using an organic binder capable of forming a gel. If the prepreg is dried and re-humidified, the binder can be hardened or cured. A three-dimensionally cross-linked binder can serve to stabilize the shape of the shaped composite material. The shaping process in step c), e.g. the pressing during the laminating step, can be influenced by the addition of a binder as well. It can be influenced that the ceramic particles be fixed in the fiber bundle and be prevented from being squeezed out. In the case of an arrangement of impregnated short fibers, the arrangement can be fixed by the binder to facilitate processing.

If such an organic binder is used, it is typically present in amount of up to 10 wt.-%, based on the total weight of the ceramic particles in the slurry as 100 wt.-%. Preferably, the amount of organic binder is 0 to 5 wt.-%, more preferred 0 to 2 wt.-%, and especially preferred 0 to 1 wt.-If an organic binder is used, the binder is typically a polymeric organic binder. Typical polymeric organic binders are polymers with a molecular weight of more than 10,000 g/mol. One class of binders known for this purpose are binders which can be used as aqueous solutions of polymers, such as polyvinyl alcohol or polyvinyl pyrrolidone. As a three-dimensionally cross-linking polymer, reference can be made to gelatin. Furthermore, examples include UV-curing binders, in particular three-dimensionally cross-linking binders. Another class is represented by binders which can be used as aqueous dispersions of polymer particles, such as a polystyrene polymer or a polyacrylate polymer. Typical average particle sizes, as determined e.g. via laser diffraction on a particle volume basis, are in the range of 0.1 to 1 μm. A prepreg can be hardened by a dispersion binder by drying it and then re-humidifying it for processing. This can be advantageous in fiber arrangements made from chopped short fibers.

Generally, it is preferred that the ceramic particles account for 95 wt.-% or more, more preferably 97 wt.-% or more, and in particular 98 wt.-% or more of the total solid content of the slurry (including solids optionally dissolved in the mixture of water and the alcoholic organic solvent, preferably glycerol). It is also preferred that optional additives, including the dispersant and the organic binder, account for 5 wt.-% or less, more preferably 3 wt.-% or less, and in particular 2 wt.-% or less of the total solid content of the slurry.

It is particularly preferred that the slurry used in step a) of the process according to the present invention and contained in the prepreg consist of the ceramic particles, water, and the alcoholic organic solvent, preferably glycerol, as essential components, as well as possibly a dispersant and/or possibly an organic binder as optional components.

In order to ensure an effective and homogeneous impregnation of the arrangement of ceramic fibers with the slurry in step a) of the process according to the present invention, the slurry in step a) preferably has a viscosity of less than 10 Pas, more preferably of less than 5 Pas, and even further preferred is a viscosity of less than 3.5 Pas. The viscosity of the slurry can e.g. be determined at a shear rate of 1 s$^{-1}$ and at a temperature of 20° C. using a rotational coaxial cylinder viscometer.

The procedure for the impregnation of the arrangement of ceramic fibers in step a) of the process according to the present invention is not particularly limited and can be achieved by a variety of methods known to the person skilled in the art for this purpose, e.g. spraying the slurry onto the fiber arrangement, pouring the slurry onto the fiber arrangement, immersing the fiber arrangement in the slurry, application of the slurry onto the fiber arrangement with an appropriate tool. The impregnation step can also be carried out automatically in a prepreg production line. The infiltration of the fiber arrangement with the slurry can also be supported by excess pressure or vacuum. The homogeneous distribution of the slurry in the fiber arrangement can be supported by ultrasound. It is also possible to remove excess slurry after the impregnation, e.g. using a blade or a spatula.

In step b) of the process according to the present invention, the water content of the slurry in the impregnated fiber arrangement is reduced in order to obtain a prepreg for a ceramic matrix composite.

In the technical field of ceramic matrix composites, the term prepreg, which is an abbreviation of the term "preimpregnated fibers", refers to preimpregnated fiber/matrix semi-finished products which can be hardened to obtain a material or component made from a ceramic matrix composite. Within the framework of the present invention, the matrix of the prepreg, or the not yet hardened precursor of the matrix in the future ceramic matrix composite, is the slurry defined herein.

Typically, the reduction of the water content in step b) is carried out by keeping the impregnated fiber arrangement at a temperature and/or relative atmospheric humidity (also referred to as rel. humidity herein) at which water vaporizes from the slurry or preferably evaporates. As will be understood by the person skilled in the art, the conditions should be selected such that the alcoholic organic solvent, preferably glycerol, remains in the slurry or is only slightly reduced (e.g. by less than 5 wt.-%, preferably by less than 3 wt.-%, based on the amount in the slurry used in step a) as 100 wt.-%) Preferably, the solvent remains. However, this is unproblematic since the alcoholic organic solvent has a relatively high boiling point. For instance, glycerol has a boiling point of 290° C. (decomposition).

As has been explained above, the preferred prepregs provided according to the present invention with a relatively high content of alcoholic organic solvent, preferably glycerol, in the slurry have the advantage that they do not irreversibly lose their hydroplasticity even when the water content is reduced quickly, e.g. at a high temperature and/or a low humidity; i.e. even if the amount of water that is removed is so high that the resulting prepreg does not exhibit plastic but e.g. elastic properties, a re-humidification of the prepreg can reestablish plastic deformability. Furthermore, the surface properties of the prepreg, in particular its tackiness, can be controlled via the water content of the slurry. During the processing of a prepreg, e.g. when preparing a laminate, it is advantageous that the prepreg have a tacky surface which facilitates laminating. Due to the presence of the alcoholic organic solvent, preferably glycerol, in relatively high amounts, the tackiness of the prepregs' surface can be maintained even after prolonged storage under typical conditions such as a temperature of 20 to 25° C. and a relative humidity of 30 to 60%. If necessary, the tackiness of the surface can also be restored by re-humidifying the prepreg. As was mentioned above, by re-humidifying after drying, the prepreg can also be hardened by a binder.

Thus, the process according to the present invention and the prepregs provided therewith offer a high degree of flexibility to the person skilled in the art for the preparation and further processing of the prepregs.

For instance, reducing the water content of the slurry in step b) comprises keeping the impregnated fiber arrangement at conditions of a temperature of 50 to 150° C. and a relative humidity of 10 to 30% for a period of time of 1 min to 2 h, preferably 1 min to 1 h. This method is also generally referred to as "drying" herein.

According to a preferred variant, which can e.g. be of importance during the rapid automatic manufacture of prepregs on a prepreg production line, the reduction of the water content of the slurry in step b) comprises keeping the impregnated fiber arrangement at conditions of a temperature of 50 to 150° C. and a relative humidity of 10 to 30% for a period of time of 1 min to 30 min, preferably 1 min to 15 min, and especially preferred 3 min to 10 min. This method is also referred to as "fast drying" herein. As was discussed above, it is especially suitable for the embodiments of the present invention wherein a slurry with a relatively high content of alcoholic organic solvent, preferably glycerol, is used in step a), e.g. a content of 21 wt.-% or more.

According to another preferred variant, the reduction of the water content of the slurry in step b) comprises a hydrothermal conditioning, i.e. keeping the impregnated fiber arrangement at a controlled temperature and a controlled humidity for a period of time sufficient for establishing an equilibrium between the water content of the slurry in the prepreg and the water content of the atmosphere surrounding it. Hydrothermal conditioning can for example be carried out in a climate chamber or in a drying cabinet under a controlled atmosphere. However, it can also be carried out by storing or even processing the impregnated fiber arrangement in a climatized room.

Exemplary conditions for hydrothermal conditioning are a temperature in the range of 10 to 30° C., a relative humidity of 30 to 80%, and a time period of 1 to 20 hours.

Preferred conditions for hydrothermal conditioning are a temperature in the range of 10 to 30° C., especially preferred 20 to 30° C., a relative humidity of 30 to 60%, especially preferred 50 to 60%, and a time period of 1 to 10 hours, especially preferred 1 to 5 hours. They are especially suitable for embodiments of the present invention wherein a slurry with a relatively high content of the alcoholic organic solvent, preferably glycerol, is used in step a), e.g. with a content of 21 wt.-% or more.

The two methods (i.e. drying or fast drying and hydrothermal conditioning) can also conveniently be combined, e.g. if a water content is adjusted by means of drying or fast drying which approaches the desired water content (also referred to as pre-drying) and then the desired water content is adjusted in a controlled manner by means of hydrothermal conditioning.

Since the prepregs according to the present invention can advantageously be rendered suitable for processing, e.g. by re-humidifying after a substantial reduction of the water content, the hydrothermal conditioning as defined above cannot only be used to reduce the water content in step b). I.e., the state of equilibrium cannot only be achieved from a state wherein the slurry in the fiber arrangement has a higher water content than the one in the equilibrium, but also from a state wherein the slurry in the fiber arrangement has a lower water content than the one in the equilibrium. Thus, in that case, hydrothermal conditioning can also be used for re-humidifying the prepreg after step b).

For instance, a prepreg which is easy to handle and can be stored can first be prepared by drying or fast drying, and it can subsequently be subjected to hydrothermal conditioning prior to processing in step c) in order to ensure optimal processing properties. By drying or fast drying and hydrothermal conditioning, the prepreg can also be hardened by a binder.

Similarly, a prepreg which is easy to handle and can be stored can first be provided in step b) using any desired method for reducing the water content, also with the help of drying or fast drying, or hydrothermal conditioning, and is subsequently stored for an extended period of time at low humidity, and therefore also subjected to hydrothermal conditioning prior to processing in step c) in order to achieve optimal processing properties.

Thus, the process according to the present invention can also comprise storing the prepreg obtained in step b) at a relative humidity of at most 60%, in particular for those embodiments of the present invention wherein in step a) a slurry with a relatively high content of the alcoholic organic solvent, preferably glycerol, is used, e.g. with a content of 21 wt.-% or more. The duration of storage is not limited; it can be several hours, but also several days or months, if desired.

As is apparent to the person skilled in the art, the reduction of the water content in step b) on the one hand leads to an increase in the viscosity of the slurry in the fiber arrangement so that the prepreg can be handled without the slurry flowing or dripping off. On the other hand, the volume fraction of the ceramic particles is increased and thus the shrinkage of the prepreg, or the green body prepared therefrom, during further processing to obtain a ceramic matrix composite is limited. Furthermore, as was mentioned above, a suitable water content in combination with the alcoholic organic solvent, preferably glycerol, can also provide a tacky surface of the prepreg.

For instance, the reduction of the water content in step b) can be carried out such that the volume fraction of the ceramic particles, based on the total volume of the slurry in the prepreg, is higher by at least 5 vol.-% after step b) than before step b). All the percentual values, i.e. the threshold value of 5 vol.-% as well, refer to the total volume of the slurry, i.e. based on the use of a slurry with a content of ceramic particles of e.g. 38 vol.-% in step a), a prepreg wherein the slurry has a content of ceramic particles of at least 43 vol.-% would be obtained after step b) is carried out.

It is more preferred that the volume fraction of the ceramic particles in the prepreg be, based on the total volume of the slurry in the prepreg, at least 45 vol.-%, even more preferred at least 50 vol.-%, and especially preferred at least 52 vol.-%. In this respect, it is preferred that the water content of the slurry in the prepreg provided in step b) be adjusted accordingly.

The volume fraction of the ceramic particles in the prepreg is preferably at most 60 vol.-%, and more preferred at most 57 wt.-%, based on the total volume of the slurry in the prepreg.

The volume fraction of the ceramic particles in the prepreg, based on the total volume of the slurry in the prepreg can for example be determined indirectly by comparing the weight of the impregnated fiber arrangement before and after the reduction of the water content in the slurry in step b) of the process according to the present invention. The volume fraction of the ceramic particles in the slurry used in the step a) for impregnating can conveniently be determined directly in the slurry. The amount of the slurry present in the prepreg can also easily be determined by comparing the weight of the fiber arrangement before and after impregnation. Thus, the remaining amount of water as well as the volume of the ceramic particles in the remaining amount of water and glycerol can be calculated based on the measured amount of water removed in step b).

At least during processing of the prepreg, the water content of the slurry in the prepreg should advantageously be adjusted such that the slurry imparts a tacky surface to the prepreg. For an amount of alcoholic organic solvent, preferably glycerol, contained in the slurry, the water content which results in a tacky surface can easily be determined by routine trials, in particular by testing the surface tack by simply touching the surface of the prepreg. The tackiness can also be determined by means of a T-Peel test. The peel strength, measured with a peel test on a T-Peel sample made of two laminated prepreg tapes with a width of 25 mm, should be at least 0.5 N/25 mm.

A preferred water fraction of the slurry contained in the prepregs at which an advantageous tackiness of the slurry is typically guaranteed, is 4 to 13 wt.-%, more preferred 4 to 11 wt.-%, and especially preferred 4 to 8 wt.-%, based on the total weight of the slurry in the prepreg as 100 wt.-%. The water fraction can be measured, e.g., by subjecting the prepreg to a drying process in which the water is completely removed.

As was already mentioned above, the information given with respect to the content of alcoholic organic solvent in relation to the total weight of the ceramic particles in the slurry used in step a) also apply to the slurry contained in the prepreg. Thus, the content of the alcoholic organic solvent, preferably glycerol, in the slurry of the resulting prepreg is preferably 21 to 35 wt.-%, based on the total weight of the ceramic particles in the slurry as 100 wt.-%. More preferred, the slurry comprises the alcoholic organic solvent, preferably glycerol, in an amount of at least 24 wt.-%, more preferred at least 25 wt.-%, and especially preferred at least 26 wt.-%, based on the total weight of the ceramic particles in the slurry as 100 wt.-%. Preferably, the slurry comprises at most 30 wt.-% of the alcoholic organic solvent, preferably glycerol, more preferred at most 29 wt.-%, and especially preferred at most 28 wt.-%, based on the total weight of the ceramic particles in the slurry as 100 wt.-%.

The volume ratio of the ceramic fibers in the prepreg to the slurry contained therein can vary greatly depending on, e.g., the fiber structure of the ceramic fibers in the fiber arrangement, and their ability to retain the slurry. For example, the volume fraction of the ceramic fibers in the prepreg can be 15 to 60 vol.-%, based on the total volume of the prepreg.

In step c) of the process of the present invention, a shaped composite material from one or more of the prepregs obtained in step b) is provided. Such a shaped composite material comprising one or more of the prepregs obtained in step b) also constitutes a material according to the present invention.

In this process step c), the prepregs according to the present invention can easily and advantageously be shaped into a desired shape.

Since they can be provided with a tacky surface, as was explained above, by adjusting the water content in the slurry, if necessary by re-humidifying the slurry, they are especially suitable for creating a shaped composite material in the form of a laminate.

The presence of the slurry allows the fibers in the prepregs to rearrange themselves when a shaped composite material is formed and thus avoid tension or damage to the fibers. Also, the prepregs can be joined without high pressure which also helps avoid damage to the fibers.

Moreover, prepregs which were combined in step c) to form a shaped composite material can also be separated again and re-combined in a different way prior to consolidation in step d) if necessary to correct the resulting shape.

The shaping process to provide a shaped composite material is not particularly limited, and a number of process steps can be listed as examples which can be carried out individually or in combination.

The provision of a shaped composite material in step c) can for example comprise a step wherein the prepreg is shaped into a desired form by cutting or punching.

The provision of a shaped composite material can for example comprise applying one or more prepregs onto a shaped support wherein the application can also involve winding one or more prepregs around a shaped support material. For example, a hollow shape can be formed, if necessary after an additional drying step or after the consolidation step, by removing the support material afterwards.

Suitable shaped support materials should preferably provide a non-flexible surface, and should preferably be able to withstand a further heat treatment which may be used to provide a green body from the prepreg without form changes. Typical support materials can be made, e.g., of plaster, wood, metal, or of ceramics. As regards the shape of the shaped support material, there are no specific limitations. Suitable shapes include molds of various geometries into which a prepreg can be laid, or supports with an outer shape, such as cylinders, onto which the prepreg can be applied.

A preferred process step for providing a shaped composite material in step c) of the process according to the present invention is laminating two or more of the prepregs obtained in step b). Thus, a preferred embodiment of the shaped composite material provided in step c) is a laminate of two or more of the prepregs according to the present invention. It is apparent to the person skilled in the art that the prepregs used for laminating are preferably present in the form of a sheet. Furthermore, it is preferred that the prepregs have a tacky surface during the lamination process. As was explained above, this can be achieved by adjusting the water content of the slurry contained in the prepreg accordingly.

For the lamination of prepregs in the context of the present invention, the prepregs are typically brought in direct contact with each other such that their surfaces touch each other, e.g. by stacking. Once the desired number of prepregs has been combined, the lamination occurs generally via the application of pressure and, if necessary, heat (e.g. in an autoclave). Advantageously, the pressure that needs to be applied for the lamination of the prepregs in accordance with the invention does not need to be high. This is due to the fact that the slurry surrounding the ceramic fibers in the prepreg is still able to flow, e.g. due to its content of alcoholic organic solvent, so that the fibers in a prepreg can still flexibly adjust their position relative to the fibers in a prepreg lying underneath and/or a prepreg lying above in the laminate. Moreover, as noted above, the inherent tackiness of the prepregs that can be provided in accordance with the present invention allows the prepregs to be adhered to each other without the need for high pressure.

This can also advantageously reduce the load applied onto the ceramic fibers during the lamination process, and prevent damage, e.g. the breaking of fibers. Generally, the pressure applied during the lamination process does not exceed 1,000 kPa, and preferably does not exceed 100 kPa. For example, the lamination can take place using a solid mold. Advantageously, for example a flexible vacuum bag can also be used for lamination, which is evacuated after introduction of a prepreg stack, e.g. to a residual pressure in the bag of 50 kPa and less, such as 5 to 40 kPa, so that the ambient pressure exerted on the vacuum bag provides the pressurization necessary for lamination. When this approach is used, step d) of consolidating by reducing the water and glycerol content can advantageously also be carried out with the support of the vacuum in a vacuum bag.

Laminates of prepregs which can be provided according to the present invention as preferred shaped composite materials preferably comprise 2 to 40, more preferred 2 to 20 prepregs, in the form of laminated sheets.

The prepregs may also be shaped prior to or after lamination, e.g. by cutting, stitching or punching the prepregs or the laminate. Also, if desired, the laminate can be provided on a shaped supporting material. Thus, after laminating, the laminate can be applied to a shaped supporting material to obtain a laminate with a predetermined three-dimensional shape.

Alternatively, 2 or more prepregs can be laminated together on a shaped supporting material to obtain a laminate with a predetermined three-dimensional shape. Suitable shaped supporting materials should preferably provide a non-flexible surface and should preferably be able to withstand a further heat treatment which may be used to form a green body from the prepreg without form changes. Typical shaped supporting materials can be made, e.g., of plaster, wood, metal, or of ceramics. As regards the shape of the shaped supporting material, there are no specific limitations. Suitable shapes include molds of various geometries into which a laminate can be laid or in which a laminate can be formed, or supports with an outer shape, such as cylinders, onto which the laminate can be applied or on which a laminate can be formed.

Upon provision of the shaped composite material, e.g. by laminating prepregs, for example a fiber volume content of 30 vol.-% or more in the shaped composite material can be achieved, based on the total volume of the shaped composite material as 100 vol.-%. Thus, advantageous mechanical characteristics can be attained. If necessary and desired for adjusting a high content of ceramic fibers per volume during the shaping process in step c) a part of the slurry may be squeezed out of the prepreg(s) forming the shaped composite material.

In step d) of the process according to the present invention, the shaped composite material obtained in step c) is consolidated by reducing the water content and the content of alcoholic organic solvent so that a green body is obtained.

As was mentioned above, in a preferred embodiment, the slurry used in steps a) to c) of the process according to the present invention to provide the prepreg and the shaped composite material comprises 21 to 35 wt.-% of the alcoholic organic solvent, preferably glycerol. It is also preferred that the content of alcoholic organic solvent, preferably glycerol, of the shaped composite material be reduced in step d) such that after consolidation, its content in the matrix material surrounding the ceramic fibers in the green body is 20 wt.-% or less, more preferred 18 wt.-% or less, and especially preferred 16 wt.-% or less, based on the total weight of the ceramic particles in the matrix material. On the other hand, due to a shortened consolidation time, it is preferred that there is still some alcoholic organic solvent, preferably glycerol, present in the green body so that the content of alcoholic organic solvent is preferably 5 wt.-% or more, more preferred 10 wt.-% or more, based on the total weight of the ceramic particles in the matrix material.

The water content of the shaped composite material can be reduced in step d) until the resulting green body no longer comprises any water or only residual amounts of water in the matrix material. The water content of a green body provided in step d) of the process according to the present invention is preferably 5 wt.-% or less, more preferred 3 wt.-% or less, based on the total weight of the green body as 100 wt.-%.

As is clear to the person skilled in the art, the term matrix material refers in this respect to the material in the green body which results from the slurry contained in the prepregs or the shaped composite material after the reduction of the water content and the content of alcoholic organic solvent in step d). During sintering of the green body, the matrix material forms the ceramic matrix which surrounds the ceramic fibers in the ceramic matrix composite. Thus, the matrix material comprises the ceramic particles and preferably the alcoholic organic solvent, and as optional components, residual amounts of water, and/or possible additives in the slurry, such as e.g. an organic binder, a dispersant and/or an additive for influencing viscosity.

Suitable measures which can be used in step d) of the process according to the present invention for reducing the water content and the content of alcoholic organic solvent are readily available to the person skilled in the art. They can in particular include heating and/or keeping the shaped composite material under reduced pressure. During heating, the shaped composite material is preferably subjected to temperatures in the range of 50 to 200° C., more preferred 100 to 170° C., and especially preferred 100 to 150° C. If an alcoholic organic solvent such as glycerol is used during the preparation process, which has a high boiling point/decomposition point above the temperature to be used for heating, it is preferred that the heated composite material be held in a gas stream or under reduced pressure in order to support the reduction of the content of alcoholic organic solvent and to evaporate the solvent. An air stream generated by a blower or a stream of an inert gas can for example be used as a gas stream for this purpose. The duration of the consolidation step can be adjusted to the desired composition of the green body. Typically, the consolidation process requires at most 15 hours, preferably at most 12 hours and especially preferred at most 11 hours.

The green body for a ceramic composite material as provided by the process according to the present invention also comprises the ceramic fibers which were impregnated in step a) of the process and which are to be present in the ceramic composite as a reinforcing structure. Moreover, the green body comprises the ceramic particles as precursors of the ceramic matrix of the composite material which form this matrix during sintering of the green body. Typically, the green body also still comprises alcoholic organic solvent, preferably glycerol, wherein the content of alcoholic organic solvent, based on the total weight of the ceramic particles, is lower than the content of alcoholic organic solvent of the prepreg according to the present invention due to the consolidation step. During the sintering process, the alcoholic organic solvent remaining in the green body is burned off without residue. It can act as a pore forming agent in the ceramic matrix, which increases the damage tolerance of the composite material.

The optional organic binder is also typically still present in the green body, provided that it was present in the slurry, and is burned off during sintering to obtain the ceramic composite material.

Other optional organic components, such as the dispersant or the optional organic binder, are also typically still present in the green body, provided that they were present in the slurry, and are burned off during sintering to obtain the ceramic composite material.

Preferably, the green body is a laminate.

As was mentioned above, the content of alcoholic organic solvent, preferably glycerol, in the green body is reduced compared to the prepreg or the shaped composite material, respectively. Preferably, its content in the matrix material surrounding the ceramic fibers in the green body is 20 wt.-% or less, more preferred 18 wt.-% or less, and especially preferred 16 wt.-% or less, based on the total weight of the ceramic particles in the matrix material. On the other hand, due to a shortened consolidation time, it is preferred that there is still some alcoholic organic solvent, preferably glycerol, present in the green body so that the content of alcoholic organic solvent is preferably 5 wt.-% or more, more preferred 10 wt.-% or more, based on the total weight of the ceramic particles in the matrix material.

Compared to the prepreg, the water content is further reduced as well, and the green body contains no or only a small amount of water which can, for example, also be taken up from the ambient air after consolidation in step d) of the process according to the present invention due to the hygroscopic properties of the remaining alcoholic organic solvent, preferably glycerol. However, the amount of alcoholic organic solvent is sufficiently low that the water uptake from the ambient air, if it takes place, is so low that it does not affect the stability of the green body. The green body is therefore typically dimensionally stable and can be stored for any desired length of time at a humidity of e.g. <60% relative humidity. The water content of the green body is preferably 5 wt.-% or less, more preferred 3 wt.-% or less, based on the total weight of the green body as 100 wt.-%.

Typically, the green body is not flexible. Typically, it is no longer tacky, either. It is preferably a self-supporting structure, i.e. a structure which retains a predetermined shape without the need for being supported.

The volume ratio of the ceramic fibers in the green body to the ceramic particles contained therein can vary significantly depending on, e.g., the fiber structure of the ceramic fibers in the fiber arrangement, and their ability to retain the particles. For example, the volume fraction of the ceramic fibers in the green body can be 15 to 60 vol.-%, based on the total volume of the green body as 100 vol.-%.

Another embodiment of the invention provides a process for the preparation of a ceramic matrix composite which comprises the steps of the preparation of a green body for a ceramic matrix composite according to the process of the present invention as described above, and sintering the green body.

Sintering is carried out at a temperature at which any water still present in the green body evaporates, the remaining alcoholic organic solvent and possibly present organic compounds, such as a dispersant and a binder, are burned off, and the ceramic particles are connected by sintering to form a ceramic matrix surrounding the ceramic fibers in the resulting ceramic matrix composite. Suitable temperatures for sintering the ceramic particles can easily be selected by the person skilled in the art. Preferably, sintering is carried out at a temperature in the range of 1,100 to 1,300° C. for composite materials with oxide-ceramic fibers, and at a temperature in the range of 1,400 to 1,600° C. for composite materials with non-oxide-ceramic fibers.

The ceramic matrix composite material, e.g. in the form of a fabric, preferably has a fiber volume content of at least 30 vol.-%, more preferred at least 35 vol.-%, and especially preferred at least 40 vol.-%, based on the total volume of the material. As was described above, it can be adjusted appropriately e.g. by the composition of the slurry in the process according to the present invention for the preparation of a green body and/or by the processing of the intermediate products in the preparation of the green body.

By using the process according to the present invention for the preparation of a green body for a ceramic matrix composite or the preparation of the ceramic matrix composite itself, the composite can be obtained within less than e.g. 36 hours, preferably within 24 hours. The time required for the steps to be carried out can be estimated as follows:

Preparing the slurry: up to about 15 min

Impregnating the fiber arrangement with the slurry and reducing the water content of the slurry to provide prepregs on a prepreg production line: up to about 15 min Laminating prepregs to provide a shaped composite material in the form of a laminate: up to about 30 min consolidating by reducing the water content and the content of alcoholic organic solvent: up to about 11 h sintering in the sintering furnace: up to about 12 h.

Important aspects of the present invention are again summarized in the following items, to which the explanations given in the description above apply analogously:

1. Process for the preparation of a green body for a ceramic matrix composite comprising the steps of:
   a) impregnating an arrangement of ceramic fibers with a slurry, which slurry comprises the following components:
      (i) 10 to 40 vol.-%, based on the total volume of the slurry, of ceramic particles,
      (ii) an alcoholic organic solvent selected from:
      (ii-1) 21 to 35 wt.-%, based on the total weight of the ceramic particles in the slurry, of glycerol,
      (ii-2) 10 to 35 wt.-%, based on the total weight of the ceramic particles in the slurry, of an oligo or polyethylene glycol with an average molecular weight of at most 800 g/mol,
      (ii-3) 10 to 35 wt.-%, based on the total weight of the ceramic particles in the slurry, of at least one C2-C6 alkane diol, and
      (ii-4) 10 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol; and
      (iii) water;
   b) reducing the water content in the slurry in the impregnated fiber arrangement to obtain a prepreg for a ceramic matrix composite;
   c) providing a shaped composite material from one or more prepregs obtained according to step b);
   d) consolidating the shaped composite material by reducing the water content and the content of alcoholic organic solvent so that a green body is obtained.

2. The process of item 1, wherein the slurry used in step a) comprises the following components:
   (i) 10 to 40 vol.-%, based on the total volume of the slurry, of ceramic particles,
   (ii) an alcoholic organic solvent selected from:
   (ii-1) 21 to 35 wt.-%, based on the total weight of the ceramic particles in the slurry, of glycerol,
   (ii-2) 21 to 35 wt.-%, based on the total weight of the ceramic particles in the slurry, of an oligo or polyethylene glycol with an average molecular weight of at most 800 g/mol,
   (ii-3) 21 to 35 wt.-%, based on the total weight of the ceramic particles in the slurry, of at least one C2-C6 alkane diol, and
   (ii-4) 21 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol; and
   (iii) water.

3. The process of item 1 or 2, wherein the alcoholic organic solvent is selected from glycerol, at least one C2-C4 alkane diol, and mixtures thereof.

4. The process of item 1 or 2, wherein the alcoholic organic solvent is glycerol.

5. The process of any of items 1 to 4, wherein the slurry comprises a dispersant.

6. The process of item 5, wherein the dispersant is an acrylic acid polymer or an acrylic acid copolymer.

7. The process of any of items 5 or 6, wherein the slurry used in step a) comprises the dispersant in an amount of up to 5 wt.-%, more preferably up to 2 wt.-%, based on the total solid content of the slurry.

8. The process of any of items 1 to 7, wherein the slurry used in step a) comprises 0 to 10 wt.-%, preferably 0 to 5 wt.-%, more preferred 0 to 2 wt.-%, particularly preferred 0 to 1 wt.-%, based on the total weight of the ceramic particles in the slurry, of an organic binder.

9. The process of any of items 1 to 8, wherein the slurry is free of organic binder.

10. The process of any of items 1 to 9, wherein the slurry used in step a) has a viscosity of less than 10 Pas, determined at a shear rate of $1 \text{ s}^{-1}$ and at a temperature of 20° C. using a rotational coaxial cylinder viscometer.

11. The process of any of items 1 to 10, wherein the ceramic particles are selected from particles formed from $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC or carbon, or from combinations of two or more types of such particles.

12. The process of any of items 1 to 11, wherein the ceramic fibers are selected from
   (i) fibers formed from $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC, SiCN, SiBNC, or carbon, or from combinations of two or more types of such fibers;

(ii) fibers formed from ceramic blends or composites of two or more of $Al_2O_3$, $SiO_2$, $ZrO_2$, $Y_2O_3$, $ZrO_2$ stabilized with $Y_2O_3$, yttrium aluminum garnet, mullite, $Si_3N_4$, SiC, SiCN, SiBNC, and carbon; and (iii) combinations of different fibers, selected from (i), (ii) or (i) and (ii).

13. The process of any of items 1 to 12, wherein the arrangement of ceramic fibers in step a) comprises rovings.

14. The process of any of items 1 to 13, wherein the arrangement of ceramic fibers in step a) is formed from continuous fibers.

15. The process of any of items 1 to 14, wherein the arrangement of ceramic fibers in step a) is a woven fabric or a non-woven.

16. The process of any of items 1 to 15, wherein the arrangement of ceramic fibers in step a) is formed from chopped fibers with a preferred length of less than 100 mm.

17. The process of any of items 1 to 16, wherein the arrangement of ceramic fibers in step a) is a sheet.

18. The process of any of items 1 to 17, wherein the slurry used in step a) comprises preferably at least 24 wt.-%, more preferably at least 25 wt.-%, particularly preferably at least 26 wt.-%, of the alcoholic organic solvent, based on the total weight of the ceramic particles in the slurry.

19. The process of any of items 1 to 18, wherein the slurry used in step a) comprises preferably at most 30 wt.-%, more preferably at most 29 wt.-%, particularly preferably at most 28 wt.-%, of the alcoholic organic solvent, based on the total weight of the ceramic particles in the slurry.

20. The process of any of items 1 to 19, wherein the slurry used in step a) comprises at least 20 vol.-% of ceramic particles, more preferably at least 25 vol.-% of ceramic particles, and particularly preferably at least 30 vol.-% of ceramic particles.

21. The process of any of items 1 to 20, wherein the water content of the slurry in the prepreg provided in step b) is adjusted such that the volume fraction of the ceramic particles in the slurry, based on the total volume of the slurry in the prepreg, is at least 5 vol.-% higher after step b) than before step b).

22. The process of any of items 1 to 21, wherein the water content of the slurry in the prepreg provided in step b) is adjusted such that the volume fraction of the ceramic particles in the slurry, based on the total volume of the slurry in the prepreg, is at least 45 vol.-%, more preferably at least 50 vol.-%, particularly preferably at least 52 vol.-%.

23. The process of any of items 1 to 22, wherein the water content of the slurry in the prepreg provided in step b) is adjusted such that the volume fraction of the ceramic particles in the slurry, based on the total volume of the slurry in the prepreg, is at most 60 vol.-%, more preferably at most 57 vol.-%.

24. The process of any of items 1 to 23, wherein the water fraction of the slurry in the prepreg provided in step b) is 4 to 13 wt.-%, more preferably 4 to 11 wt.-% and particularly preferably 4 to 8 wt.-%, based on the total weight of the slurry in the prepreg.

25. The process of any of items 1 to 24, wherein the volume fraction of the ceramic fibers in the prepreg is 15 to 60 vol.-%, based on the total volume of the prepreg.

26. The process of any of items 1 to 25, wherein step b) of reducing the water content comprises keeping the impregnated fiber arrangement at conditions of a temperature of 50 to 150° C. and a relative humidity of 10 to 30% for a period of time of 1 min to 2 h.

27. The process of any of items 1 to 26, wherein step b) of reducing the water content comprises keeping the impregnated fiber arrangement at conditions of a temperature of 50 to 150° C. and a relative humidity of 10 to 30% for a period of time of 1 to 30 min.

28. The process of any of items 1 to 27, wherein step b) of reducing the water content comprises hydrothermal conditioning of the impregnated fiber arrangement.

29. The process of item 28, wherein the hydrothermal conditioning is carried out at a temperature in the range of 10 to 30° C., particularly preferably 20 to 30° C., a relative humidity of 30 to 80%, and for a period of time of 1 to 20 hours.

30. The process of item 28 or 29, wherein the hydrothermal conditioning is carried out at a temperature in the range of 10 to 30° C., particularly preferably 20 to 30° C., a relative humidity of 30 to 60%, particularly preferably 50 to 60%, and for a period of time of 1 to 10 hours, preferably 1 to 5 hours.

31. The process of any of items 1 to 30, wherein after step b), the process comprises a re-humidification of the prepreg(s) by means of hydrothermal conditioning.

32. The process of item 31, wherein the hydrothermal conditioning is carried out at a temperature in the range of 10 to 30° C., particularly preferably 20 to 30° C., a relative humidity of 30 to 60%, preferably 50 to 60%, and for a period of time of 1 to 10 hours, particularly preferably 1 to 5 hours.

33. The process of any of items 1 to 32, wherein the process comprises storing the prepreg obtained in step b) at a relative humidity of at most 60%.

34. The process of any of items 1 to 33, wherein the provision of a shaped composite material in step c) comprises applying one or more of the prepregs obtained in step b) onto a shaped support.

35. The process of any of items 1 to 34, wherein the shaped composite material is a laminate and wherein the provision of a shaped composite material in step c) comprises laminating two or more of the prepregs provided in step b).

36. The process of item 35, wherein the laminate is applied onto a shaped support material so that a laminate with a predetermined three-dimensional shape is obtained.

37. The process of item 35, wherein the two or more prepregs are laminated on a shaped support material so that a laminate with a predetermined three-dimensional shape is obtained.

38. The process of item 34, wherein in step c) one or more of the prepregs obtained in step b) are wound around a shaped support material.

39. The process of any of items 2 to 38, wherein in step d) the content of alcoholic organic solvent in the shaped composite material is reduced to such a degree that after consolidation the content of alcoholic organic solvent in the matrix material of the green body is 20 wt.-% or less, more preferably 18 wt.-% or less, particularly preferably 16 wt.-% or less, based on the total weight of the ceramic particles in the matrix material.

40. The process of any of items 1 to 39, wherein the reduction of the water content and the content of alcoholic organic solvent in step d) is carried out by heating the shaped composite material to 100° C. or more and at reduced pressure or in a gas stream.

41. Process for the preparation of a ceramic matrix composite material comprising the steps for the preparation of a green body according to the process of any of items 1 to 40, and sintering the green body.

42. The process of item 41, wherein the ceramic matrix composite material has a fiber volume content of at least 30 vol.-%, more preferably at least 35 vol.-%, and particularly preferably at least 40 vol.-%, based on the total volume of the material.

43. Prepreg for a ceramic matrix composite material comprising an arrangement of ceramic fibers impregnated with a slurry wherein the slurry comprises (i) ceramic particles, (ii) an alcoholic organic solvent and (iii) water, and wherein the alcoholic organic solvent is selected from:
   (ii-1) 21 to 35 wt.-%, based on the total weight of the ceramic particles in the slurry, of glycerol,
   (ii-2) 10 to 35 wt.-%, based on the total weight of the ceramic particles in the slurry, of an oligo or polyethylene glycol with an average molecular weight of at most 800 g/mol,
   (ii-3) 10 to 35 wt.-%, based on the total weight of the ceramic particles in the slurry, of at least one C2-C6 alkane diol, and
   (ii-4) 10 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol.

44. The prepreg of item 43, wherein the alcoholic organic solvent is selected from:
   (ii-1) 21 to 35 wt.-%, based on the total weight of the ceramic particles in the slurry, of glycerol,
   (ii-2) 21 to 35 wt.-%, based on the total weight of the ceramic particles in the slurry, of an oligo or polyethylene glycol with an average molecular weight of at most 800 g/mol,
   (ii-3) 21 to 35 wt.-%, based on the total weight of the ceramic particles in the slurry, of at least one C2-C6 alkane diol, and
   (ii-4) 21 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol.

45. The prepreg of item 43 or 44, wherein the alcoholic organic solvent is selected from glycerol, at least one C2-C4 alkane diol, and mixtures thereof.

46. The prepreg of any of items 43 to 45, wherein the alcoholic organic solvent is glycerol.

47. The prepreg of any of items 43 to 46, wherein the slurry comprises a dispersant.

48. The prepreg of item 47, wherein the dispersant is an acrylic acid polymer or an acrylic acid copolymer.

49. The prepreg of item 47 or 48, wherein the slurry comprises the dispersant in an amount of up to 5 wt.-%, more preferably 2 wt.-%, based on the total solid content of the slurry.

50. The prepreg of any of items 43 to 49, wherein the slurry comprises 0 to 10 wt.-%, preferably 0 to 5 wt.-%, more preferred 0 to 2 wt.-%, particularly preferred 0 to 1 wt.-%, based on the total weight of the ceramic particles in the slurry, of an organic binder.

51. The prepreg of any of items 43 to 50, wherein the slurry is free of organic binder.

52. The prepreg of any of items 43 to 51, wherein the ceramic particles are selected from particles formed from $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC or carbon, or from combinations of two or more types of such particles.

53. The prepreg of any of items 43 to 52, wherein the ceramic fibers are selected from (i) fibers formed from $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC, SiCN, SiBNC, or carbon, or from combinations of two or more types of such fibers;

(ii) fibers formed from ceramic blends or composites of two or more of $Al_2O_3$, $SiO_2$, $ZrO_2$, $Y_2O_3$, $ZrO_2$ stabilized with $Y_2O_3$, yttrium aluminum garnet, mullite, $Si_3N_4$, SiC, SiCN, SiBNC, and carbon; and (iii) combinations of different fibers, selected from (i), (ii) or (i) and (ii).

54. The prepreg of any of items 43 to 53, wherein the arrangement of ceramic fibers comprises rovings.

55. The prepreg of any of items 43 to 54, wherein the arrangement of ceramic fibers is formed from continuous fibers.

56. The prepreg of any of items 43 to 55, wherein the arrangement of ceramic fibers is a woven fabric or a non-woven.

57. The prepreg of any of items 43 to 54, wherein the arrangement of ceramic fibers is formed from chopped fibers with a preferred length of less than 100 mm.

58. The prepreg of any of items 43 to 57, wherein the arrangement of ceramic fibers in step a) is a sheet.

59. The prepreg of any of items 43 to 58, wherein the slurry comprises at least 24 wt.-%, more preferably at least 25 wt.-%, particularly preferably at least 26 wt.-%, of the alcoholic organic solvent, based on the total weight of the ceramic particles in the slurry.

60. The prepreg of any of items 43 to 59, wherein the slurry used in step a) comprises at most 30 wt.-%, more preferably at most 29 wt.-%, and particularly preferably at most 28 wt.-%, of the alcoholic organic solvent, based on the total weight of the ceramic particles in the slurry.

61. The prepreg of any of items 43 to 60, wherein the volume fraction of the ceramic particles in the slurry is at least 45 vol.-%, more preferably at least 50 vol.-%, based on the total volume of the slurry in the prepreg.

62. The prepreg of any of items 43 to 61, wherein the volume fraction of the ceramic particles in the slurry is at most 60 vol.-%, based on the total volume of the slurry in the prepreg.

63. The prepreg of any of items 43 to 62, wherein the water fraction of the slurry is 4 to 13 wt.-%, more preferably 4 to 11 wt.-%, and particularly preferably 4 to 8 wt.-%, based on the total weight of the slurry in the prepreg.

64. Shaped composite material comprising one or more prepregs according to any of items 43 to 63.

65. The shaped composite material of item 64, wherein the composite material is a laminate of two or more of the prepregs according to any of items 43 to 63.

Important aspects of the preferred embodiment of the invention using glycerol described above are again summarized in the following items to which the explanations given in the description above apply analogously:

1A. Process for the preparation of a green body for a ceramic matrix composite comprising the steps of:
   a) impregnating an arrangement of ceramic fibers with a slurry, which slurry comprises the following components:
      10 to 40 vol.-%, based on the total volume of the slurry, of ceramic particles,
      21 to 35 wt.-%, based on the total weight of the ceramic particles in the slurry, of glycerol, and water;
   b) reducing the water content in the slurry in the impregnated fiber arrangement to obtain a prepreg for a ceramic matrix composite;

c) providing a shaped composite material from one or more prepregs obtained according to step b);

d) consolidating the shaped composite material by reducing the water content and the content of alcoholic organic solvent so that a green body is obtained.

2A. The process of item 1A, wherein the slurry comprises a dispersant.

3A. The process of item 2A, wherein the dispersant is an acrylic acid polymer or an acrylic acid copolymer.

4A. The process of any of items 2A or 3A, wherein the slurry used in step a) comprises the dispersant in an amount of up to 2 wt.-%, based on the total solid content of the slurry.

5A. The process of any of items 1A to 4A, wherein the slurry used in step a) comprises 0 to 2 wt.-%, preferably 0 to 1 wt.-%, based on the total weight of the ceramic particles in the slurry, of an organic binder.

6A. The process of any of items 1A to 5A, wherein the slurry is free of organic binder.

7A. The process of any of items 1A to 6A, wherein the slurry used in step a) has a viscosity of less than 10 Pas, determined at a shear rate of $1\ s^{-1}$ and at a temperature of 20° C. using a rotational coaxial cylinder viscometer.

8A. The process of any of items 1A to 7A, wherein the ceramic particles are selected from particles formed from $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC or carbon, or from combinations of two or more types of such particles.

9A. The process of any of items 1A to 8A, wherein the ceramic fibers are selected from fibers formed from $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC, SiCN, SiBNC, or carbon, or from combinations of two or more types of such fibers.

10A. The process of any of items 1A to 9A, wherein the arrangement of ceramic fibers in step a) comprises rovings.

11A. The process of any of items 1A to 10A, wherein the arrangement of ceramic fibers in step a) is formed from continuous fibers.

12A. The process of any of items 1A to 11A, wherein the arrangement of ceramic fibers in step a) is a woven or a non-woven fabric.

13A. The process of any of items 1A to 10A, wherein the arrangement of ceramic fibers in step a) is formed from chopped fibers with a preferred length of less than 100 mm.

14A. The process of any of items 1A to 13A, wherein the arrangement of ceramic fibers in step a) is a sheet.

15A. The process of any of items 1A to 14A, wherein the slurry used in step a) comprises preferably at least 24 wt.-% of glycerol, more preferably at least 25 wt.-% of glycerol, particularly preferably at least 26 wt.-% of glycerol, based on the total weight of the ceramic particles in the slurry.

16A. The process of any of items 1A to 15A, wherein the slurry used in step a) comprises preferably at most 30 wt.-% of glycerol, more preferably at most 29 wt.-% of glycerol, particularly preferably at most 28 wt.-% of glycerol, based on the total weight of the ceramic particles in the slurry.

17A. The process of any of items 1A to 16A, wherein the slurry used in step a) comprises at least 20 vol.-% of ceramic particles, more preferably at least 25 vol.-% of ceramic particles, and particularly preferably at least 30 vol.-% of ceramic particles.

18A. The process of any of items 1A to 17A, wherein the water content of the slurry in the prepreg provided in step b) is adjusted such that the volume fraction of the ceramic particles in the slurry, based on the total volume of the slurry in the prepreg, is at least 45 vol.-%, more preferably at least 50 vol.-%, particularly preferably at least 52 vol.-%.

19A. The process of any of items 1A to 18A, wherein the water content of the slurry in the prepreg provided in step b) is adjusted such that the volume fraction of the ceramic particles in the slurry, based on the total volume of the slurry in the prepreg, is at most 60 vol.-%, more preferably at most 57 vol.-%.

20A. The process of any of items 1A to 19A, wherein the water fraction of the slurry in the prepreg provided in step b) is 4 to 13 wt.-%, more preferably 4 to 11 wt.-% and particularly preferably 4 to 8 wt.-%, based on the total weight of the slurry in the prepreg.

21A. The process of any of items 1A to 20A, wherein the volume fraction of the ceramic fibers in the prepreg is 15 to 60 vol.-%, based on the total volume of the prepreg.

22A. The process of any of items 1A to 21A, wherein step b) of reducing the water content comprises keeping the impregnated fiber arrangement at conditions of a temperature of 50 to 150° C. and a relative humidity of 10 to 30% for a period of time of 1 to 30 min.

23A. The process of any of items 1A to 22A, wherein step b) of reducing the water content comprises hydrothermal conditioning of the impregnated fiber arrangement.

24A. The process of item 23A, wherein the hydrothermal conditioning is carried out at a temperature in the range of 10 to 30° C., particularly preferably 20 to 30° C., a relative humidity of 30 to 60%, particularly preferably 50 to 60%, and for a period of time of 1 to 10 hours, particularly preferably 1 to 5 hours.

25A. The process of any of items 1A to 24A, wherein after step b), the process comprises a re-humidification of the prepreg(s) by means of hydrothermal conditioning.

26A. The process of item 25A, wherein the hydrothermal conditioning is carried out at a temperature in the range of 10 to 30° C., particularly preferably 20 to 30° C., a relative humidity of 30 to 60%, particularly preferably 50 to 60%, and for a period of time of 1 to 10 hours, particularly preferably 1 to 5 hours.

27A. The process of any of items 1A to 26A, wherein the process comprises storing the prepreg obtained in step b) at a relative humidity of at most 60%.

28A. The process of any of items 1A to 27A, wherein the provision of a shaped composite material in step c) comprises applying one or more of the prepregs obtained in step b) onto a shaped support.

29A. The process of any of items 1A to 28A, wherein the shaped composite material is a laminate and wherein the provision of a shaped composite material in step c) comprises laminating two or more of the prepregs obtained in step b).

30A. The process of item 29A, wherein the laminate is applied onto a shaped support material so that a laminate with a predetermined three-dimensional shape is obtained.

31A. The process of item 29A, wherein the two or more prepregs are laminated on a shaped support material so that a laminate with a predetermined three-dimensional shape is obtained.

32A. The process of item 28A, wherein in step c) one or more of the prepregs obtained in step b) are wound around a shaped support material.

33A. The process of any of items 1A to 32A, wherein in step d) the content of glycerol in the shaped composite material is reduced to such a degree that after consolidation the content of glycerol in the matrix material of the green body is 20 wt.-% or less, more preferably 18 wt.-% or less, particularly preferably 16 wt.-% or less, based on the total weight of the ceramic particles in the matrix material.

34A. The process of any of items 1A to 33A, wherein the reduction of the water content and the glycerol content in step d) is carried out by heating the shaped composite material to 100° C. or more and at reduced pressure or in a gas stream.

35A. Process for the preparation of a ceramic matrix composite comprising the steps for the preparation of a green body according to the process of any of items 1A to 34A, and sintering the green body.

36A. The process of item 35A, wherein the ceramic matrix composite has a fiber volume content of at least 30 vol.-%, preferably at least 35 vol.-%, and more preferred at least 40 vol.-%, based on the total volume of the material.

37A. Prepreg for a ceramic matrix composite comprising an arrangement of ceramic fibers impregnated with a slurry wherein the slurry comprises ceramic particles, glycerol, and water, and wherein the glycerol is present in an amount of 21 to 35 wt.-%, based on the total weight of the ceramic particles in the slurry.

38A. The prepreg of item 37A, wherein the slurry comprises a dispersant.

39A. The prepreg of item 38A, wherein the dispersant is an acrylic acid polymer or an acrylic acid copolymer.

40A. The prepreg of item 38A or 39A, wherein the slurry comprises the dispersant in an amount of up to 2 wt.-%, based on the total solid content of the slurry.

41A. The prepreg of any of items 37A to 40A, wherein the slurry comprises 0 to 2 wt.-%, particularly preferably 0 to 1 wt.-%, based on the total weight of the ceramic particles in the slurry, of an organic binder.

42A. The prepreg of any of items 37A to 41A, wherein the slurry is free of organic binder.

43A. The prepreg of any of items 37A to 42A, wherein the ceramic particles are selected from particles formed from $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC or carbon, or from combinations of two or more types of such particles.

44A. The prepreg of any of items 37A to 43A, wherein the ceramic fibers are selected from fibers formed from $Al_2O_3$, $SiO_2$, $ZrO_2$, $Y_2O_3$, $ZrO_2$ stabilized by $Y_2O_3$, yttrium aluminum garnet, mullite, $Si_3N_4$, SiC, SiCN, SiBNC, or carbon, or from combinations of two or more types of such fibers.

45A. The prepreg of any of items 37A to 44A, wherein the arrangement of ceramic fibers comprises rovings.

46A. The prepreg of any of items 37A to 45A, wherein the arrangement of ceramic fibers is formed from continuous fibers.

47A. The prepreg of any of items 37A to 46A, wherein the arrangement of ceramic fibers is a woven fabric or a nonwoven.

48A. The prepreg of any of items 37A to 45A, wherein the arrangement of ceramic fibers is formed from chopped fibers with a preferred length of less than 100 mm.

49A. The prepreg of any of items 37A to 48A, wherein the arrangement of ceramic fibers in step a) is a sheet.

50A. The prepreg of any of items 37A to 49A, wherein the slurry comprises at least 24 wt.-% of glycerol, more preferably at least 25 wt.-% of glycerol, particularly preferably at least 26 wt.-% of glycerol, based on the total weight of the ceramic particles in the slurry.

51A. The prepreg of any of items 37A to 50A, wherein the slurry used in step a) comprises at most 30 wt.-% of glycerol, more preferably at most 29 wt.-% of glycerol, and particularly preferably at most 28 wt.-% of glycerol, based on the total weight of the ceramic particles in the slurry.

52A. The prepreg of any of items 37A to 51A, wherein the volume fraction of the ceramic particles in the slurry is at least 45 vol.-%, more preferably at least 50 vol.-%, based on the total volume of the slurry in the prepreg.

53A. The prepreg of any of items 37A to 52A, wherein the volume fraction of the ceramic particles in the slurry is at most 60 vol.-%, based on the total volume of the slurry in the prepreg.

54A. The prepreg of any of items 37A to 53A, wherein the water fraction of the slurry is 4 to 13 wt.-%, more preferably 4 to 11 wt.-%, and particularly preferably 4 to 8 wt.-%, based on the total weight of the slurry in the prepreg.

55A. Shaped composite material comprising one or more prepregs according to any of items 37A to 54A.

56A. The shaped composite material of item 55A, wherein the composite material is a laminate of two or more of the prepregs according to any of items 37A to 54A.

EXAMPLES

Example 1

The process is shown using the example of the preparation of oxide-ceramic prepregs. As reinforcement, Nextel™610 DF19 fabrics (supplied by 3M) are used. Before processing, the sizing is burned out (700° C. for 2 h). The aqueous slurry has a solids content of 67 wt.-% and comprises an $Al_2O_3$—$ZrO_2$ powder mixture (80% MRS1, Albemarle; 20% TZ-3Y-E, Krahn Chemie), 1 wt.-% Dispergator Sokalan PA 15, 26 wt.-% glycerol, based on the solid. The woven fabrics are impregnated with slurry and the excess slurry is removed with a doctor blade. In order to obtain the tacky prepreg, different methods are used. In Variant A, the infiltrated fabric is stored in a climate chamber at 60% relative humidity and 25° C. for 24 hours. In Variant B, a partial removal of water is carried out at 50° C. (15 min, about 10% relative humidity) in a drying cabinet. The drying duration is selected such that the removal of water corresponds to the state of equilibrium of Variant A (see drawing 3). In Variant C (not shown in drawing 2), water is first partially removed at 50° C. (15 min) and followed by storage in the climate chamber at 60% relative humidity and 25° C. (24 h). Variant D is a combination of 60 minutes of water removal at 50° C. and storage in the climate chamber at 60% relative humidity and 25° C. (24 h). In that case, the prepreg was re-humidified in order to achieve the state of equilibrium.

FIG. 1 shows the change in the water content of the slurry in the prepreg during the course of conditioning or drying, with a view to the water content of the slurry after infiltration and as a function of the duration.

Then the tacky prepregs are laminated onto a form (lab conditioned to 25° C. and 60% relative humidity). After consolidating (100° C. with blower, 11 h), the green body is stable and no longer tacky due to the removal of water and glycerol. The composites are sintered at a temperature of 1,225° C. and a holding period of 2 hours. The bending strength in all methods is about 300 MPa and a uniform prepreg quality is obtained (Table 1).

TABLE 1

3-point bending strength of composite materials whose prepregs were conditioned differently

| Sintered Composites (4 layers DF19, 11×11 cm²) | Fiber volume content [vol.-%] | Bending strength [MPa] | Method of hydrothermal conditioning |
|---|---|---|---|
| Climate chamber 60% rel. hum., 25° C. (24 h) | 44 | 334 ± 25 | Method A |

TABLE 1-continued 3-point bending strength of composite materials whose prepregs were conditioned differently

| Sintered Composites (4 layers DF19, 11×11 cm²) | Fiber volume content [vol.-%] | Bending strength [MPa] | Method of hydrothermal conditioning |
|---|---|---|---|
| Partial removal of water at 50° C. (15 min) | 47 | 320 ± 9 | Method B |
| Partial removal of water at 50° C. (15 min), climate chamber 60% rel. hum., 25° C. (24 h) | 45 | 299 ± 34 | Method C |
| Partial removal of water at 50° C. (60 min) and re-humidification climate chamber 60% rel. hum., 25° C. (24 h) | 46 | 294 ± 18 | Method D |

Example 2

The process is shown using the example of the preparation of oxide-ceramic prepregs. As reinforcement, Nextel™610 DF19 fabrics (supplied by 3M) are used. Before processing, the sizing is burned out (700° C. for 2 h). The aqueous slurry has a solids content of 67 wt.-% and comprises an $Al_2O_3$—$ZrO_2$ powder mixture (80% MRS1, Albemarle; 20% TZ-3Y-E, Krahn Chemie), 1 wt.-% Dispergator Sokalan PA 15, 26 wt.-% ethane-1,2-diol, based on the solid. The woven fabrics are impregnated with slurry and the excess slurry is removed with a doctor blade.

In order to obtain the tacky prepreg, the infiltrated fabric is stored in the climate chamber at 60% relative humidity and 25° C. for 20 hours.

Then the tacky prepregs are laminated onto a form (lab conditioned to 25° C. and 60% relative humidity). After consolidating (100° C. with blower, 11 h), the green body is stable and no longer tacky due to the removal of water and ethane-1,2-diol. The composites are sintered at a temperature of 1,225° C. and a holding period of 2 hours.

The invention claimed is:

1. A process for the preparation of a green body for a ceramic matrix composite comprising the steps of:
   a) impregnating an arrangement of ceramic fibers with a slurry to form an impregnated fiber arrangement, wherein the slurry comprises the following components:
      (i) 10 to 40 vol.-%, based on the total volume of the slurry, of ceramic particles,
      (ii) an alcoholic organic solvent selected from:
         (ii-1) 21 to 35 wt.-%, based on the total weight of the ceramic particles in the slurry, of glycerol,
         (ii-2) 21 to 35 wt.-%, based on the total weight of the ceramic particles in the slurry, of an oligo or polyethylene glycol with an average molecular weight of at most 800 g/mol,
         (ii-3) 21 to 35 wt.-%, based on the total weight of the ceramic particles in the slurry, of at least one C2-C6 alkane diol, and
         (ii-4) 21 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol; and
      (iii) water;
   b) reducing the water content in the slurry in the impregnated fiber arrangement to obtain a prepreg for a ceramic matrix composite;
   c) providing a shaped composite material from one or more prepregs obtained according to step b); and
   d) consolidating the shaped composite material by reducing the water content and the content of alcoholic organic solvent so that a green body is obtained.

2. The process of claim 1, wherein the alcoholic organic solvent is glycerol.

3. The process of claim 1, wherein the slurry used in step a) contains at least 24 wt.-% of the alcoholic organic solvent, based on the total weight of the ceramic particles in the slurry.

4. The process of claim 1, wherein the slurry used in step a) contains at least 20 vol.-% of ceramic particles.

5. The process of claim 1, wherein the water content of the slurry in the prepreg provided in step b) is adjusted such that the volume fraction of the ceramic particles in the slurry, based on the total volume of the slurry in the prepreg, is at least 45 vol.-%.

6. The process of claim 1, wherein the water fraction of the slurry in the prepreg provided in step b) is 4 to 13 wt.-%, based on the total weight of the slurry in the prepreg.

7. The process of claim 1, wherein the volume fraction of the ceramic fibers in the prepreg is 15 to 60 vol.-%, based on the total volume of the prepreg.

8. The process of claim 1, wherein step b) of reducing the water content comprises keeping the impregnated fiber arrangement at conditions of a temperature of 50 to 150° C. and a relative humidity of 10 to 30% for a period of time of 1 min to 2 h.

9. The process of claim 1, wherein step b) of reducing the water content comprises hydrothermal conditioning of the impregnated fiber arrangement.

10. The process of claim 1, wherein after step b), the process comprises a re-humidification of the prepreg(s) by means of hydrothermal conditioning.

11. A process for the preparation of a ceramic matrix composite comprising the steps for the preparation of a green body according to the process of claim 1, and sintering the green body.

12. A prepreg for a ceramic matrix composite comprising an arrangement of ceramic fibers impregnated with a slurry wherein the slurry comprises (i) ceramic particles, (ii) an alcoholic organic solvent and (iii) water, and
   wherein the volume fraction of the ceramic particles in the slurry is 10 to 40 vol.-%, based on the total volume of the slurry in the prepreg, and
   wherein the alcoholic organic solvent is selected from:
      (ii-1) 21 to 35 wt.-%, based on the total weight of the ceramic particles in the slurry, of glycerol,
      (ii-2) 21 to 35 wt.-%, based on the total weight of the ceramic particles in the slurry, of an oligo or polyethylene glycol with an average molecular weight of at most 800 g/mol, (ii-3) 21 to 35 wt.-%, based on the total weight of the ceramic particles in the slurry, of at least one C2-C6 alkane diol, and (ii-4) 21 to 35 wt.-%, based on the total weight of the ceramic particles in the slurry, of a mixture of two or more components, selected from a C2-C6 alkane diol, an oligo or polyethylene glycol with an average molecular weight of at most 800 g/mol, and glycerol.

13. The prepreg of claim 12, wherein the alcoholic organic solvent is glycerol.

14. The prepreg of claim 12, wherein the slurry contains at least 24 wt.-% of the alcoholic organic solvent, based on the total weight of the ceramic particles in the slurry.

15. The prepreg of claim 12, wherein the water fraction of the slurry is 4 to 13 wt.-%, based on the total weight of the slurry in the prepreg.

16. A shaped composite material comprising one or more prepregs according to claim 12, wherein the composite material is a laminate of two or more of the prepregs according to claim 12.

* * * * *

UNITED STATES PATENT AND TRADEMARK OFFICE
CERTIFICATE OF CORRECTION

| | |
|---|---|
| PATENT NO. | : 11,001,531 B2 |
| APPLICATION NO. | : 16/311984 |
| DATED | : May 11, 2021 |
| INVENTOR(S) | : Knohl et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 65 days.

Signed and Sealed this
Thirty-first Day of January, 2023

Katherine Kelly Vidal
*Director of the United States Patent and Trademark Office*